(12) United States Patent
Hammer et al.

(10) Patent No.: US 7,228,374 B2
(45) Date of Patent: Jun. 5, 2007

(54) DATA TRANSMISSION SYSTEM FOR CONNECTING A CONTROLLER WITH DRIVES

(75) Inventors: Josef Hammer, Erlangen (DE); Gerhard Heinemann, Erlangen (DE); Martin Kiesel, Poxdorf (DE); Rolf-Dieter Pavlik, Erlangen (DE); Guido Seeger, Baiersdorf (DE)

(73) Assignee: Siemens Aktiengesellschaft, München (DE)

( * ) Notice: Subject to any disclaimer, the term of this patent is extended or adjusted under 35 U.S.C. 154(b) by 510 days.

(21) Appl. No.: 10/789,410

(22) Filed: Feb. 27, 2004

(65) Prior Publication Data

US 2004/0199267 A1    Oct. 7, 2004

(30) Foreign Application Priority Data

Feb. 27, 2003    (DE)    ................. 103 08 654

(51) Int. Cl.
*G06F 13/00*    (2006.01)
*G06F 3/00*    (2006.01)
*G06F 13/42*    (2006.01)
*G06F 5/00*    (2006.01)

(52) U.S. Cl. ............... 710/315; 710/105; 710/300; 710/305; 710/100

(58) Field of Classification Search .......... 710/100, 710/300, 105, 305, 313
See application file for complete search history.

(56) References Cited

U.S. PATENT DOCUMENTS

2003/0028765 A1 *    2/2003    Cromer et al. ............... 713/164

FOREIGN PATENT DOCUMENTS

| DE | 197 52 015 A1 | 5/1999 |
| DE | 101 47 434 A1 | 10/2002 |
| DE | 101 38 066 A1 | 2/2003 |

OTHER PUBLICATIONS

Entwicklung einer PCI-Schnittstellenkarte für die Datenübertragung zwischen einem PC mit PCI-Local-Bus und einem Parallelrechner, Stefan Luik, Masters Thesis No.: 1504, University Stuttgart, Faculty of Informatics, 1977.
High-Speed-Master Intelligente Profibus-Anschaltung für PCI-Bus, Brochure No. 4.001., 1999, No. 7, pp. 28 and follow.

* cited by examiner

*Primary Examiner*—Kim Huynh
*Assistant Examiner*—Scott Sun
(74) *Attorney, Agent, or Firm*—Henry M. Feiereisen

(57) ABSTRACT

A data transmission system is described that connects a controller with drives in machine tools and production machines. The controller can be connected via an internal data bus with at least one internal drive, wherein the same data bus profiles are used for the internal data bus as for an external data bus. A user then sees the same data interface both for a central control topology and a drive-based control topology. This allows the user to readily interchange the two topologies and port existing applications to the various control topologies.

16 Claims, 4 Drawing Sheets

DATA TRANSMISSION SYSTEM FOR CONNECTING A CONTROLLER WITH DRIVES

CROSS-REFERENCES TO RELATED APPLICATIONS

This application claims the priority of German Patent Application, Serial No. 103 08 654.4, filed Feb. 27, 2003, pursuant to 35 U.S.C. 119(a)–(d), the disclosure of which is incorporated herein by reference.

BACKGROUND OF THE INVENTION

The present invention relates to a data transmission system for connecting a controller with drives in machine tools or production machines via a data bus, and more particularly for connecting a controller with differently configured drives or for connecting differently configured drives with each other using different bus systems. In the application, the term "production machine" is used here in a generic sense and includes also robots which generally follow the concepts outlined here.

Currently two different commercially available control topologies are used for controlling motors and/or axles of machine tools or production machines, including robots. One control topology is referred to as a central control topology, whereas the other control topology is referred to as a drive-based control topology.

FIG. 1 shows in the form of a block diagram an exemplary conventional central control topology. This control topology includes a controller 1 which forms a self-contained building block and is connected for data exchange via an external data bus 2 to external drives 3a, 3b and 3c, and optionally to additional drives (not shown for sake of clarity). Each drive 3a, 3b and 3c includes control modules implemented as hardware and/or software modules, as well as a converter module for controlling and powering a motor 5a, 5b or 5c which drives, for example, an axle of the machine tool or production machine. The converter module need not be integrated in the drive, but can also be an external module connected to the drive. The control modules and the converter modules are not shown for sake of clarity.

For determining the actual controlled variables, the individual drives are connected with transducers, whereby only one corresponding transducer 6a, 6b and 6c is shown in FIG. 1 for sake of clarity. In addition, as depicted in FIG. 1, the drives 3a, 3b and 3c are frequently connected with I/O units (input output units) 4a, 4b and 4c to enable exchange of data and/or signals between the drives and the I/O units. The I/O units 4a, 4b and 4c can also be an integral component of the corresponding drive. For controlling a motor of an axle of the machine, the controller 1 transmits via the external data bus 2 a desired axle value (e.g., desired position value or desired rotation speed value) to the external drive 3a which controls the motor 5a according to a preset desired axle position value. With the central control topology, the controller 1 and the external drives form separate units that are connected with each other for data exchange via the external data bus 2 which can be implemented, for example, as a Profibus.

FIG. 2 shows in form of a block diagram a different conventional control topology referred to as drive-based control topology. Unlike the central control topology depicted in FIG. 1, the controller 1 of the drive-based control topology together with an internal drive 8 forms a single unit which is referred to as drive-based controller 7. The controller 1 and the internal drive 8 is connected for data exchange via an internal data bus 12 which can be implemented for example as PCI (Peripheral Component Interconnect) data bus. The internal drive 8 is also connected with an I/O unit 9, a motor 10 and a transducer 11. The drive 8 includes control modules implemented as hardware and/or software modules, as well as converter modules for controlling and powering a motor 10 which drives, for example, an axle of the machine tool or production machine. The converter module need not be integrated in the drive 8, but can also be an external module connected to the drive. A single drive can also include several converter modules. The control modules and the converter modules are not shown in FIG. 2 for sake of clarity. The motor 10 is controlled in the same manner as described above with reference to the central control topology, by transmitting desired values from the controller 1 via the internal data bus 12 to the internal drive 8a as desired controlled variables. Optionally, the drive-based controller 7 can also have several internal drives, as illustrated in FIG. 8.

In the two control topologies described above, the actual values determined by the transducers and I/O units are returned to the controller via the data bus, for example for display to an operator. It should be mentioned that the internal drive 8 can also be connected to several motors, transducers or additional I/O units, so that several axles can be controlled simultaneously using a single internal drive 8.

The drive-based control topologies of FIG. 2 are increasingly used due to their favorable cost and performance. However, disadvantageously, the drive-based control topology can control only a limited number of motors and/or drives when using a single drive-based controller 7. To this date, it has not been possible to expand drive-based control topologies by, for example, connecting external drives to a drive-based controller.

It would therefore be desirable and advantageous to provide an improved system for controlling drives of machine tools and/or production machines that are capable of operating with different drive topologies, which obviates prior art shortcomings and more specifically facilitates porting existing user applications between the different drive topologies.

SUMMARY OF THE INVENTION

According to one aspect of the present invention, a data transmission system for machine tools or production machines includes a controller, at least one internal drive and at least one external drive. An internal parallel data bus with an internal data bus profile connects the controller with the internal drive. An external data bus with an external data bus profile that is identical to the internal data bus profile connects the controller with the external drive. The external bus can be a Profibus, a real-time Ethernet bus, a USB bus, a FireWire bus, a Sercos bus and/or a Profinet bus or a combination thereof.

According to another aspect of the invention, a data transmission system for machine tools or production machines includes a controller, at least one internal drive and at least one external drive. An internal parallel data bus with an internal data bus profile connects the controller with the internal drive. An external data bus with an external data bus profile that is identical to the internal data bus profile connects an internal drive with an external drive. The external bus can be a Profibus, a real-time Ethernet bus, a USB bus, a FireWire bus, a Sercos bus and/or a Profinet bus or a combination thereof.

The afore-described embodiments advantageously retain the user interfaces that relate to the bus participant, such as the functions of activating/deactivating bus participants when using Profibus. The data transmission system of the invention, due to the uniform logical appearance of the internal and external drives, can be easily scaled, i.e., the number of drives and I/O units that can be connected to the controller can be readily increased, and the drives and the I/O units integrated in the drives or externally connected to the drives can be more efficiently utilized.

With the uniform approach for configuring and programming the internal and external drives, including the corresponding I/O units, applications and/or programs for the controller can be generated that operate identically for both internal and external drives and can therefore be easily interchanged between the different control topologies. The user interface, from the controller to the internal and external drives, is identical and uses identical data bus profiles. In addition, the internal drive is modeled in the same way as an external bus participant and can be configured as a so-called slave. This means that the user interfaces related to the bus participant, for example the functions of activating/deactivating bus participants with Profibus, remain identical. The interface between controller and internal drives, which are modeled as bus participants, has the same system properties as the interface between controller and external drives. This applies in particular to the timing and the exchange of desired and actual data. The scalability is enhanced by enabling additional drives and I/O units to be homogeneously connected to a drive-based controller via an external fieldbus.

Moreover, with the data transmission system of the invention, drives from other manufacturers can be readily connected to drive-based controllers via an external fieldbus.

According to another feature of the invention, if the external data bus supports a secure data communication (e.g. PROFIsafe), this secure data communication is also available on the internal data bus without additional measures, since the internal and external data bus profiles are identical. Internal and external drive can also be closely coupled, since the same timing characteristic and performance can be set for these drives. When using central control topologies, the I/O units typically used with internal drives and integrated in the external drive can be homogeneously integrated into the configuration and programming concepts in the same way as the I/O units of external drives. I/O units can therefore be transparently expanded outside the external data bus.

According to another feature of the present invention, the internal data can be a parallel bus, in particular a PCI bus. A PCI bus is a widespread bus system.

According to another feature of the present invention, the external data bus can be a Profibus, a real-time Ethernet bus, a USB bus, a FireWire bus, a Sercos bus and/or a Profinet bus. Profibus, real-time Ethernet bus, FireWire bus, Sercos bus and Profinet bus are well-known bus systems.

According to another feature of the present invention, the I/O units integrated in the internal drives or connected externally can be integrated with external drives having the same data bus profile. The I/O units of internal and external drives can then be treated equally by the user.

Advantageously, the internal data bus, the controller and the internal drive can be logically configured in the same manner as the external data bus.

According to another feature of the present invention, the at least one internal drive and the at least one external drive are closely coupled, in particular with respect to clock pulse synchronization and/or identical timing and/or synchronized acquisition of actual values.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
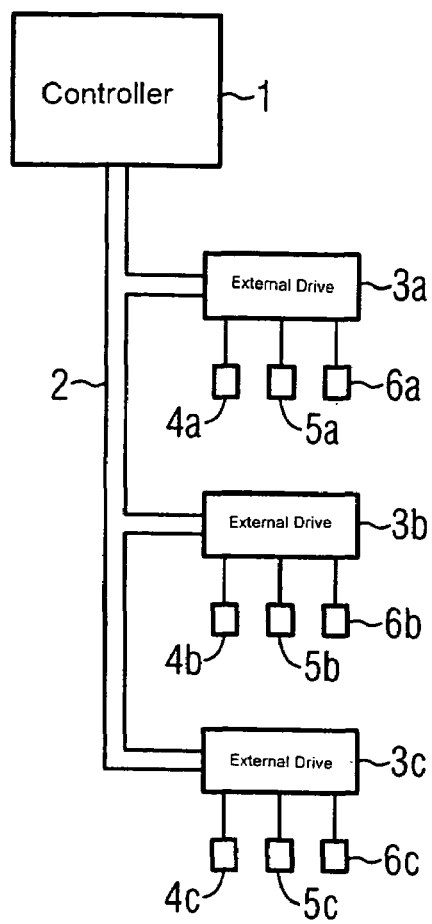
FIG. 1 shows a schematic block diagram of a conventional central control topology.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
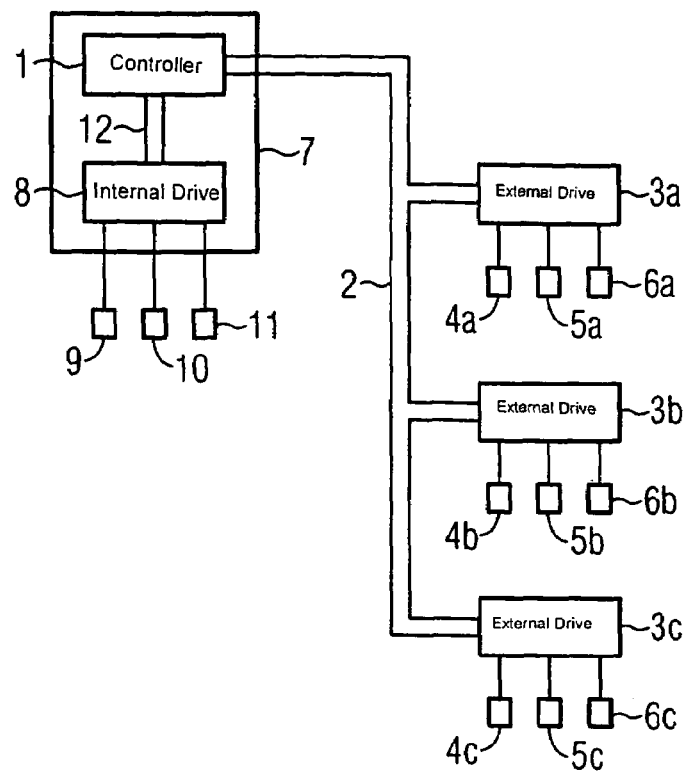
FIG. 3 shows a schematic block diagram of a drive-based control topology with additional decentralized drives according to the present invention.

Turning now to the drawing, and in particular to FIG. 3, there is shown in form of block diagram a physical view of the data transmission system according to the present invention. A drive-based controller 7 is connected for data exchange with the internal drive 8 via an internal bus 12 which in the illustrated embodiment is implemented as a PCI bus. The drive 8 is connected with an external I/O unit 9, a motor 10 and a transducer 11. The internal drive 8 includes control and converter modules for controlling and powering the motor 10. The control and converter modules are not shown for the sake of clarity.

The controller 1, the internal data bus 12 and the internal drive 8 are implemented in a common unit. The internal drive 8 is capable of simultaneously controlling several motors or axles of the machine, whereby only one motor 10, one I/O unit 9 and one transducer 11 are shown for sake of clarity. The I/O unit which is depicted as an external I/O unit, can also be an integral component of the internal drive 8.

The motor 10 is controlled by presetting in the control module of the drive 8, for example with the help of a position controller implemented inside the controller 1, via the internal bus 12 a desired axle rotation value as a desired value. The drive 8 then controls the motor according to the desired axle value and moves, for example, an axle of the machine to the corresponding desired axle position value.

Figure 2:
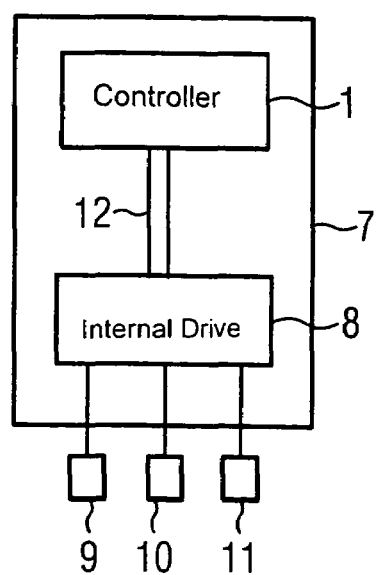
FIG. 2 shows a schematic block diagram of a conventional drive-based control topology.

So far, FIG. 3 is identical with FIG. 2. However, unlike FIG. 2, the drive-based controller 7 or the controller 1 in FIG. 3 is connected with the external drives 3a, 3b and 3c for data exchange via an external data bus 2, which in the illustrated embodiment is implemented as a Profibus. Each of the drives 3a, 3b and 3c is connected with a corresponding external I/O unit 4a, 4b and 4c as well as with a corresponding motor 5a, 5b and 5c and a corresponding transducer 6a, 6b and 6c. The motor 5a is again controlled by computing in the controller 1 a desired axle position value which is transmitted to a control module located, for example, inside the external drive 3a. The external drive 3a controls with an actual value signal generated by the transducer 6a the motor 5a according to the desired value set by the controller 1. Conversely, signals from the drives 3a, 3b and 3c can be transmitted, for example for display purposes, from the I/O units to the controller 1. The external data bus 2 can, of course, also be a real-time Ethernet bus, a FireWire bus, a Sercos bus, a Profinet bus, and/or a USB (Universal Serial Bus) bus.

For configuring and programming the system, the internal drive 8 and the external drives 3a, 3b and 3c should be logically equivalent, since a designer, programmer or user would then no longer have to be concerned with the differences between an internal drive 8 and an external drive 3a, 3b and 3c. Applications and/or programs, which were originally written, for example, for the central control topology of FIG. 1 or the entirely drive-based control topology according to FIG. 2, or for a drive-based control topology depicted FIG. 3, can then be interchangeably used also for one of the other topologies.

Figure 7:
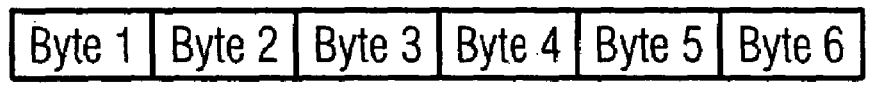
FIG. 7 shows an illustration of a data bus profile.

Each the data bus has a so-called data bus profile. FIG. 7 shows an embodiment of a data bus profile. In a physical sense, a telegram is transmitted on the data bus as a sequence of data bytes. The data bus profile describes the content, i.e., the meaning of a message or a telegram, e.g., the employed data type (bytes, word), and the significance (e.g., actual value, desired value, control word or status word). The sender and recipient of different manufacturers can then interpret the telegram in the same way. In one example, the two first bytes in a data bus profile may represent a control word, e.g. a command for a drive, with the bytes 3 to 6 representing, for example, a desired rotation speed value. In a response telegram from a drive, the first to bytes can describe, for example, the state of the drive and the bytes 3 to 6 can describe an actual rotation speed value. Optionally, a data bus can also include several different data bus profiles. A data bus profile can also include at the beginning and the end of a telegram additional data used to coordinate the telegram traffic on the data bus. These additional data are not shown in FIG. 7 for sake of clarity.

According to the invention, the same data bus profiles are used for communicating on the internal data bus 12 as on the external data bus 2. In the embodiment depicted in FIG. 3, the internal data bus 12 which is implemented as a PCI bus operates in principle like a Profibus due to its data bus profile which is identical to the data bus profile of the external data bus 2 implemented as a Profibus. The data interface between the controller 1 and the internal drive 8 is hence defined like the data interface between the controller 1 and the drives 3a, 3b and 3c.

Figure 5:
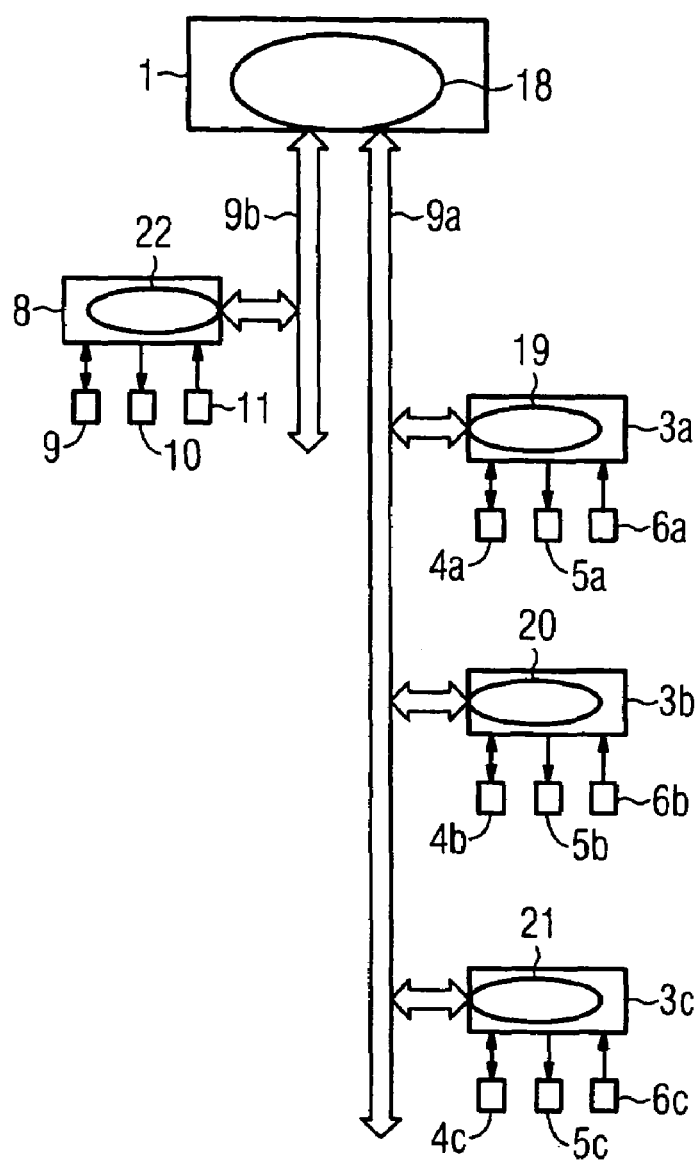
FIG. 5 shows a logical design and programming diagram of the integration of the drives to the controller.

FIG. 5 shows in form of a block diagram the resulting logical programming and configuration view of the data interface between the controller 1 and the internal drive 8, as well as between the controller 1 and the external drives 3a, 3b and 3c. When looking at the logical connection, all internal drives are connected to a so-called internal virtual Profibus 9a which is also depicted in FIG. 5. All external drives are connected, again looking at their logical connection, to an external Profibus 9a, also depicted in FIG. 5. In the depicted embodiment, external and internal drives are connected to separate Profibuses 9a and 9b. Alternatively, the external and internal drives can also be connected to a common Profibus, or individual drives or groups of drives can be connected to a dedicated Profibus, looking at their logical connection. The controller 1 operates as a so-called master 18, whereas the drives operate as slaves. Accordingly, a slave 22 is associated with the internal drive 8, a slave 19 is associated with the external drive 3a, a slave 20 is associated with the external drive 3b, and a slave 21 is associated with the external drive 3c. The internal drive 8 therefore appears, with respect to the logical and bus-topological connection, like an additional slave 22 that is connected to the virtual internal Profibus 9a. The slaves 19, 20 and 21 are connected to the external Profibus 9b.

The virtual internal Profibus 9a is configured in the same manner at the external Profibus 9b. The settings defined by the integration boundary conditions can shorten the design phase, because optionally fixed settings can be used. The configuration of the internal virtual Profibus 9a is only marginally different from the configuration of the external Profibus 9b, due to physical differences (e.g., transmission duration with a PCI bus as compared to a 12 MBaud Profibus solution).

FIG. 5 uses the same identifiers for the I/O units, the motors and the transducers as FIG. 3. It should be mentioned that an I/O unit connected to the external drive 8 or an I/O unit integrated in the internal drive 8 is homogeneously integrated by the data transmission system of the invention in the same manner as the I/O units of the decentralized drives 3a, 3b and 3c. This approach enables scaling of the number of I/O units close to the drives.

Figure 6:
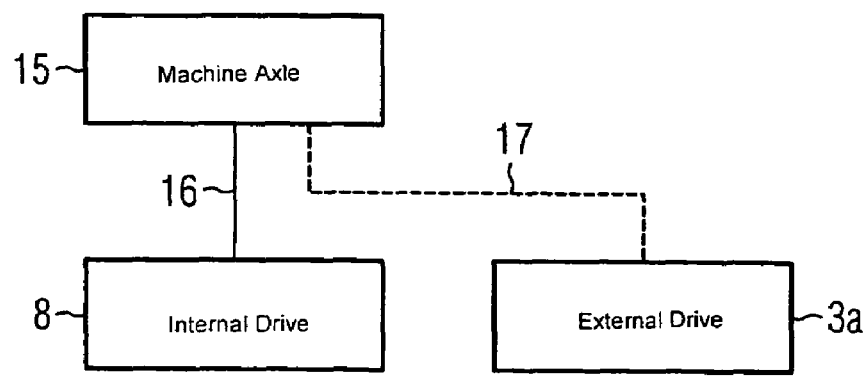
FIG. 6 shows schematic block diagram of a design of a drive axle.

FIG. 6 shows in form of a block diagram an advantageous exemplary configuration of the data transmission system of the invention. The machine axles and drives are represented by a rectangular functional blocks. For example, an operator assigns a machine axle 15 to the internal drive 8, which can be accomplished graphically by connecting the machine axle 15 with the internal drive 8 by a connecting line 16. If the operator inputs a position and a desired displacement of the machine axle 15, for example 20 mm, then the drive axle 15 associated with the external drive 8 will be moved by 20 mm. If in the depicted embodiment an axle associated with the external drive 3a is to be moved instead of the axle 15 associated with the internal drive 8, then the operator has to delete the connection 15 and establish a connection 17 indicated by a dotted line. Configuring an internal or external axle appears therefore identical to a user.

Figure 4:
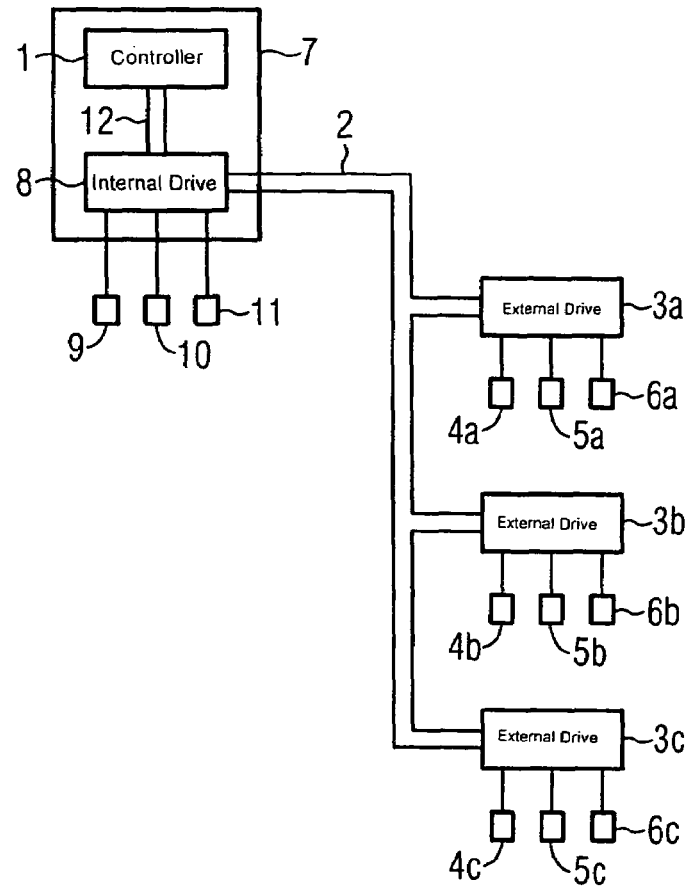
FIG. 4 shows schematic block diagram of an alternative drive-based control topology with additional decentralized drives according to the invention.

FIG. 4 shows a block diagram of another alternative embodiment of the data transmission system of the invention. This block diagram corresponds essentially to that of FIG. 3, with the exception that the external data bus is not connected with the controller 1, but with the internal drive 8. The data from the internal controller 1 are then physically transmitted first to the internal drive 8 and from there via the external bus 2 to the external drives 3a, 3b and 3c and vice versa. Such bus structure or network structure can be employed to externally extend the internal data bus so as to scale the number of drives via a kind of "back wall bus." For example, the drive-internal communication system can then be used for connecting drive components (such as power components, motors, transducers) for a "back wall bus extension."

The external extension can be implemented by a different medium, such as a real-time Ethernet bus, FireWire bus or Profibus.

By configuring the data bus profile of the internal data bus 12 identical to the data bus profile of the external data bus 2, the logical configuration and programming environment is again identical to that depicted in FIG. 5, depending on the employed external bus system. The external data bus 2 can, of course, also be implemented as a USB (Universal Serial Bus) bus. The identifiers used in FIG. 4 for the I/O units, motors and transducers are identical to those of FIG. 3.

Figure 8:
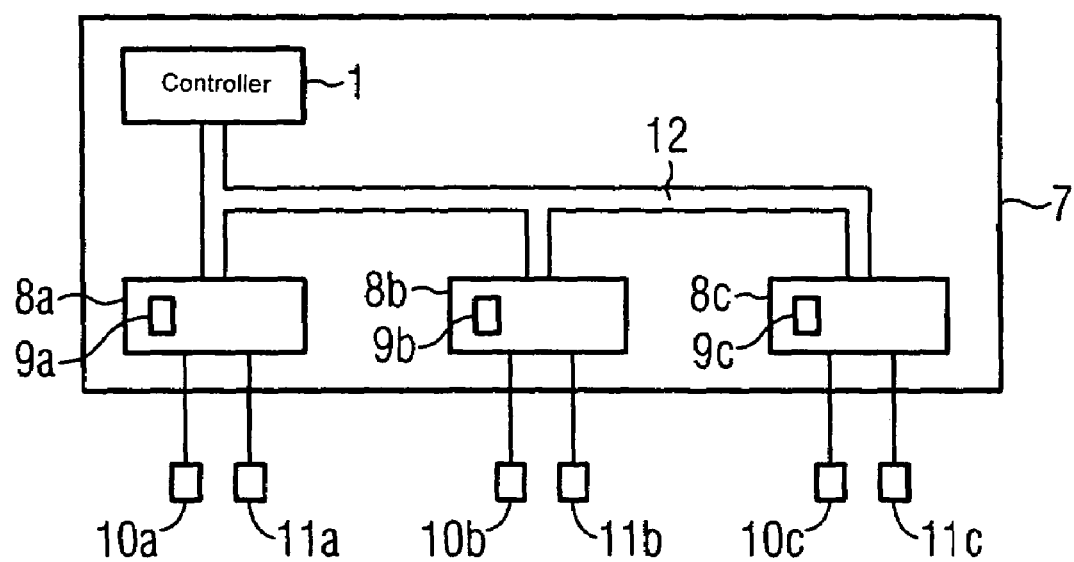
FIG. 8 shows a schematic block diagram of a drive-based control topology with several internal drives.

The block diagram of FIG. 8 shows another embodiment of the data transmission system of the invention. A drive-based controller 7 is connected with the internal drives 8a, 8b and 8c for data exchange via an internal bus 12, which in this embodiment is implemented as a PCI bus. Each of the drives 8a, 8b and 8c is connected with a corresponding internal I/O unit 9a, 9b and 9c that is integrated in the corresponding drive, with a motor 10a, 10b and 10c and with a transducer 11a, 11b and 11c. The internal drives 8a, 8b and 8c each include control modules which can be implemented as hardware or software modules, as well as a converter for controlling and powering the motor 10. The control modules and the converter are not shown for sake of clarity. The controller 1, the internal data bus 12 and the internal drives 8a, 8b and 8c are located in a common unit. The individual drives 8a, 8b and 8c can be addressed in an identical manner due to the fact that the same data bus profiles are used on the internal data bus 12 as on the external data bus, so that they appear logically to be connected to an external data bus. The external data bus, which is not physically implemented in the embodiment of FIG. 8, can be defined, for example, as a Profibus. Accordingly, the user can address the individual drives 8a, 8b and 8c as Profibus participants, for example as slaves. The application and/or the program on the controller 1 remain fully functional even if the system is expanded at a later date by connecting to an external data bus. The additional drives, for example external drives, are then logically connected to the bus system simply as additional slaves.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A data transmission system for a machine tool or production machine, comprising:
    a drive based-controller including a controller;
    at least one internal drive disposed inside the drive based-controller and controlling a first axle of the machine tool or production machine;
    at least one external drive disposed outside the drive based-controller and controlling a second axle of the machine tool or production machine;
    an internal parallel data bus connecting the controller with the at least one internal drive; and
    an external serial data bus connecting the controller with the at least one external drive,
    wherein data are transmitted via the parallel bus and the serial bus in form of a telegram with an identical data bus profile describing operating parameters of the at least one external drive and the at least one internal drive, said parameters selected from the group consisting of actual position value of an axle, setpoint value of an axle, status of the drive, and status of a component of the drive.

2. The data transmission system of claim 1, wherein the internal drives and the external drives further comprise I/O units, with the I/O units of the internal drives integrated in or externally connected to the internal drives, said I/O units being connected with the corresponding internal and external drives for data transmission encoded by the identical data bus profile.

3. The data transmission system of claim 1, wherein the internal parallel data bus, the controller and the at least one internal drive are logically configured in the same manner as the external data bus.

4. The data transmission system of claim 1, wherein the at least one internal drive and the at least one external drive are coupled with each other so as to exhibit at least one of clock synchronism, identical timing and synchronized acquisition of an actual value.

5. A data transmission system for a machine tool or production machine, comprising:
    a drive based-controller including a controller;
    at least one internal drive disposed inside the drive based-controller and controlling a first axle of the machine tool or production machine;
    at least one external drive disposed outside drive based-controller and controlling a second axle of the machine tool or production machine;
    an internal parallel data bus connecting the controller with the at least one internal drive; and
    an external serial data bus connecting the at least one internal drive with the at least one external drive,
    wherein data are transmitted via the parallel bus and the serial bus in form of a telegram with an identical data bus profile describing operating parameters of the at least one external drive and the at least one internal drive, said parameters selected from the group consisting of actual position value of an axle, setpoint value of an axle, status of the drive, and status of a component of the drive.

6. The data transmission system of claim 5, wherein the internal drives and the external drives further comprise I/O units, with the I/O units of the internal drives integrated in or externally connected to the internal drives, said I/O units being connected with the corresponding internal and external drives for data transmission encoded by the identical data bus profile.

7. The data transmission system of claim 5, wherein the internal parallel data bus, the controller and the at least one internal drive are logically configured in the same manner as the external data bus.

8. The data transmission system of claim 5, wherein the at least one internal drive and the at least one external drive are coupled with each other so as to exhibit at least one of clock synchronism, identical timing and synchronized acquisition of an actual value.

9. The data transmission system of claim 1, wherein the first drive comprises a first control module and a first converter module connected to a first motor that drives the first axle of the machine tool or production machine.

10. The data transmission system of claim 1, wherein the second drive comprises a second control module and a second converter module connected to a second motor that drives the second axle of the machine tool or production machine.

11. The data transmission system of claim 9, further comprising a first transducer operatively connected to the first drive and providing axle position values to the first control module of the first drive.

12. The data transmission system of claim 10, further comprising a second transducer operatively connected to the second drive and providing axle position values to the second control module of the second drive.

13. The data transmission system of claim 5, wherein the first drive comprises a first control module and a first converter module connected to a first motor that drives the first axle of the machine tool or production machine.

14. The data transmission system of claim 5, wherein the second drive comprises a second control module and a second converter module connected to a second motor that drives the second axle of the machine tool or production machine.

15. The data transmission system of claim 13, further comprising a first transducer operatively connected to the first drive and providing axle position values to the first control module of the first drive.

16. The data transmission system of claim 14, further comprising a second transducer operatively connected to the second drive and providing axle position values to the second control module of the second drive.

* * * * *